United States Patent

[11] 3,564,218

[72] Inventor Clark M. Lay
    Oak Ridge, Tenn.
[21] Appl. No. 722,046
[22] Filed Apr. 17, 1968
[45] Patented Feb. 16, 1971
[73] Assignee the United States of America as represented
    by the United States Atomic Energy
    Commission

[54] BIDIRECTIONAL COUNTING SYSTEM
    1 Claim, 3 Drawing Figs.
[52] U.S. Cl. ................................................. 235/92,
    307/222, 235/151.11
[51] Int. Cl. ................................................ G06m 3/14
[50] Field of Search .................................... 235/92, 66,
    60, 29(G), 62, 28, 151.11; 328/44; 307/222

[56] References Cited
    UNITED STATES PATENTS
    2,850,240 9/1958 Dickinson .................. 235/92
    3,015,064 12/1961 Husted et al. ............... 235/92
    3,277,380 10/1966 Paufve ....................... 307/222X OTHER REFERENCES
Dual Beam Laser Interferometer - p. 6 Instruction & Maintenance Manual Prepared for the Nat. Bureau of Standards - June 1966

Primary Examiner—Maynard R. Wilbur
Assistant Examiner—Joseph M. Thesz, Jr.
Attorney—Roland A. Anderson ABSTRACT: A bidirectional counting system is provided for use in a position indicating device wherein the displacement of a movable component is sensed by an interferometer. A feedback generator of the interferometer senses increments of movement in a forward or reverse direction and generates a pair of phase-displaced signals one leading the other, depending upon the direction of movement. The leading signal is detected by a phase detector which generates an appropriate output signal at either a forward or reverse output. These outputs are applied to a bidirectional counter which registers pulses applied at a forward input as a counting increment and registers counts applied at a reverse input as a counting decrement. The counter is comprised of counting stages gated together so that the existing states of the counter stages enable the counter to register either a forward or reverse count without a separate direction command input. A display is provided to display the instantaneous net count of the forward or reverse pulses received.

PATENTED FEB 16 1971         3,564,218
SHEET 1 OF 3
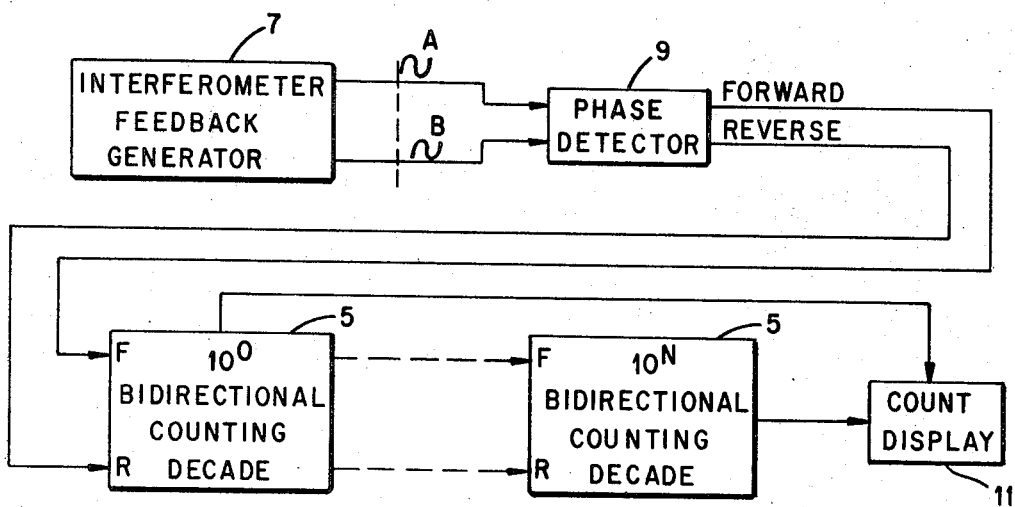
*Fig. 1*
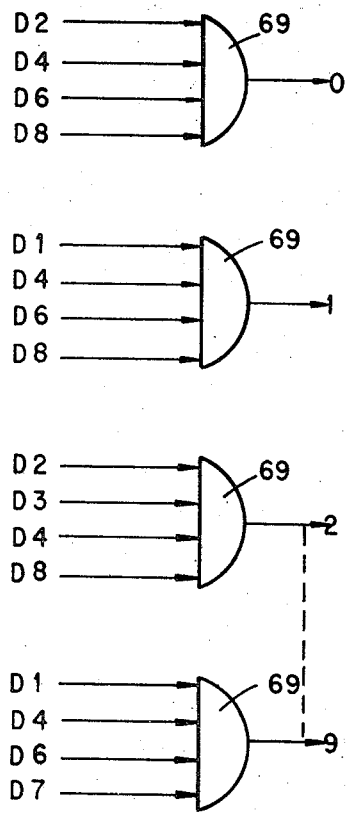
*Fig. 3*
| COUNT | $2^0$ | $2^1$ | $2^2$ | $2^3$ |
|---|---|---|---|---|
| 0 | R | R | R | R |
| 1 | S | R | R | R |
| 2 | R | S | R | R |
| 3 | S | S | R | R |
| 4 | R | R | S | R |
| 5 | S | R | S | R |
| 6 | R | S | S | R |
| 7 | S | S | S | R |
| 8 | R | R | R | S |
| 9 | S | R | R | S |
*Fig. 4*
INVENTOR.
Clark M. Lay
BY
*ATTORNEY.*

# BIDIRECTIONAL COUNTING SYSTEM

BACKGROUND OF THE INVENTION

This invention was made during the course of, or under, a contract with the U.S. Atomic Energy Commission.

This invention relates to an electronic counting system and more specifically to a bidirectional counting system for use with an interferometer position indicating device which does not require separate count direction commands.

Bidirectional counting systems of the known prior art generally take the form of two different types. One type has a single count pulse input line and generates two separate count direction command inputs, one for switching a counter to receive pulses to increase the count and the other for switching the counter to receive pulses to decrease the count. The other general type provides forward and reverse counts at separate inputs and generates a single count direction command input which is connected to a separate input of a counter to register either a forward or reverse count depending upon the polarity of the command signal. Obviously, the direction commands must be synchronized with their corresponding count pulses. This operation requires time which limits the response of the counting systems.

In certain positioning systems, the position of a movable component, such as a machine slide, is measured by means of an interferometer. The interferometer develops two fringe patterns which are 90° out of phase. By means of light responsive circuitry, the patterns are converted to two sinusoidal voltages having a phase displacement of 90°. One cycle of each of the voltages is generated each time the machine slide moves through a "fringe distance," e.g., 12.457 microinches. The interferometer is oriented so that forward movement of the slide causes a certain one of the voltages to lead; backward movement causes the other voltage to lead. These outputs are applied to a phase detector. The phase detector responds to the leading one of the phase-displaced inputs by generating a square wave pulse at either a forward or reverse output depending upon which input signal is leading. To facilitate counting these pulses with the prior art counters the phase detector must generate a direction command signal for each count pulse. At high counting rates, such as those resulting from vibration of an interferometer generating the input pulse, it has been found that counts are lost because circuitry periodically fails to synchronize the count pulses. Further, counts are lost when the direction of motion is reversed because conventional counters are unable to respond to the rapid bidirectional application of pulses to be counted.

SUMMARY OF THE INVENTION

In view of the deficiencies of the above-described prior art systems, it is a general object of the present invention to provide a bidirectional counting system which is particularly adapted for use in high speed reversible counting.

Another object of the present invention is to provide a bidirectional counter which can be rapidly reversed in counting direction without losing counts.

Another object of the present invention is to provide a counting system for use with an interferometer which does not require the generation of a separate counting direction command signal.

Still another object of the present invention is to provide a counting system which is relatively economical and easy to manufacture.

In accordance with the present invention there is provided a bidirectional counting system for a position indicating device wherein the displacement of a movable component is monitored by an interferometer having a feedback generator. The feedback generator senses movement of the component with light responsive circuitry and generates first and second phase-displaced signals at separate outputs for each increment of movement of the component. A phase detector is connected to receive the outputs of the feedback generator and generates a count pulse at a forward output when the first signal is leading and generates a count pulse at a reverse output when the second signal is leading. These "forward" and "reverse" outputs are connected to corresponding inputs of a special bidirectional counter. The counter has a plurality of binary stages, each of the stages including a bistable device capable of operation in a set and reset state, each of said stages having set and reset inputs and corresponding outputs. Each of the set and reset inputs of each of the stages has a gating means connected thereto for gating either "forward" or "reverse" count pulses to the inputs in accordance with a predetermined binary counting order. The gates are enabled by the existing state of the various stages so that the counter registers either a "forward" or "reverse" count input directly without the application of a separate direction command signal.

Other objects and many of the attendant advantages of the present invention will be readily evident from the following detailed description when taken in conjunction with the accompanying drawings.

BRIEF DESCRIPTION OF THE DRAWINGS

FIG. 1 is a block diagram of a bidirectional counting system according to the present invention;

FIG. 3 is a schematic representation of the count display of FIG. 3;

FIG. 4 is a logic table for one of the decades as shown in FIG. 2; and

DETAILED DESCRIPTION

Figure 2:
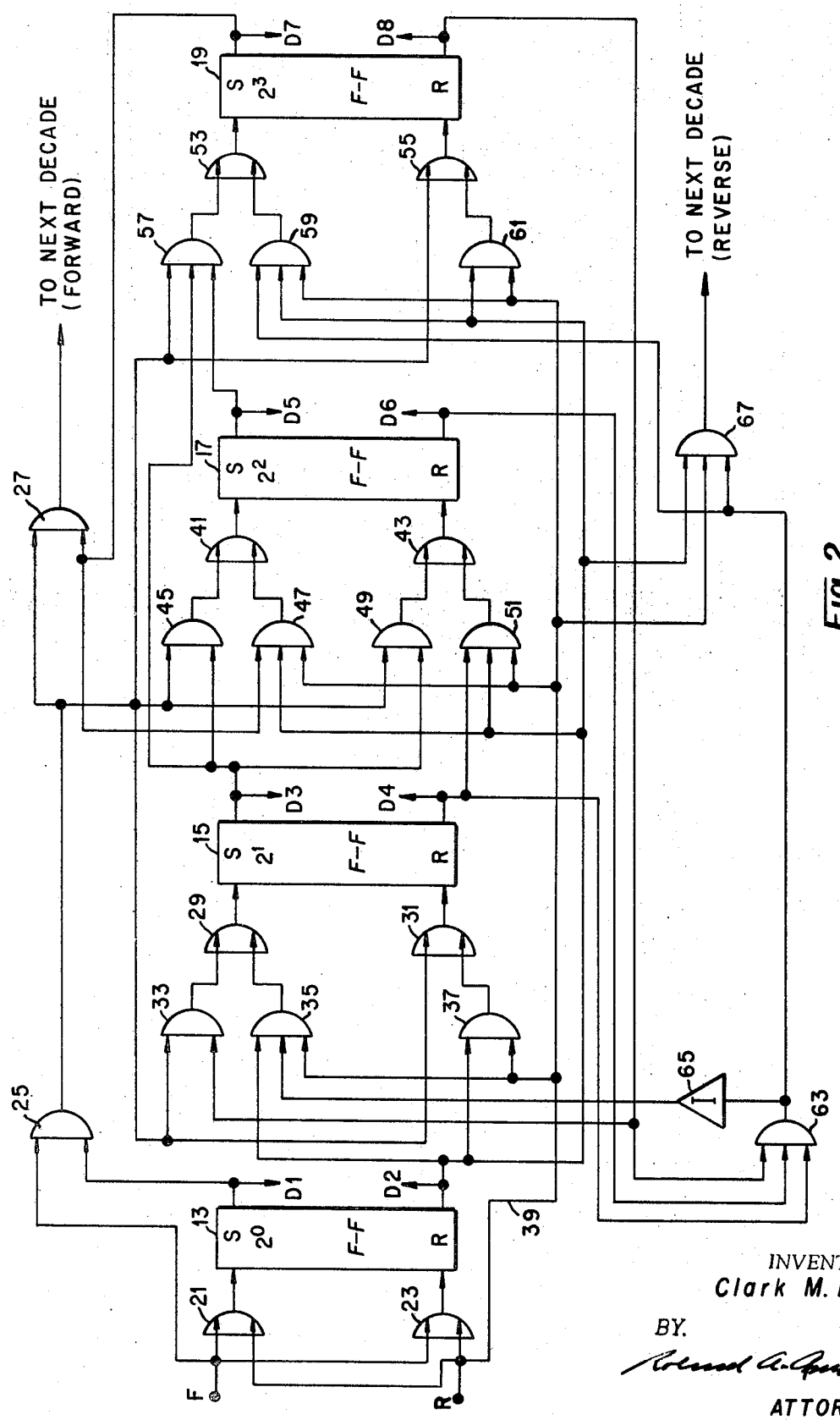
FIG. 2 is a logic diagram of one of the counter decades of FIG. 1.

Referring now to FIG. 1, a preferred embodiment of the present invention is illustrated in block diagram form. As shown, an interferometer feedback generator 7 of, for example, a machine positioning system senses the motion of a machine slide on which the interferometer is mounted and provides a pair of phase-displaced signals A and B at its output. The generator is arranged so that when the machine slide is moving in a forward direction signal A leads signal B, as shown, by a normal phase displacement of 90°. When the machine slide is moving in the reverse direction signal B then leads signal A by a phase displacement of 90°. This phase displacement is sensed by a phase detector, such as the one disclosed in copending application Ser. No. 699,575, filed Jan. 22, 1968 now U.S. Pat. No. 3,517,322 issued Jun. 23, 1970. This detector responds by generating a square wave output pulse and applying it to a forward output for each cycle of the A signal leading the B signal, and, likewise, a square wave output pulse appears at a reverse output for each cycle of the B signal leading the A signal. When the machine slide is traveling extremely fast output pulses from the detector 9 appear at an extremely fast rate. Further, since a cycle of the A or B signal represents approximately 12 microinches of movement, machine vibrations, rapid stopping and reversing of the slide causes the A and B signals to reverse in phase displacement between any given number of cycles. This causes the forward and reverse outputs of the phase detector 9 to approach coincident operation. That is, forward and reverse pulses are applied to the counter with extremely short time displacement. Therefore, it is imperative that the counter be able to count reversibly in equal time in order to avoid losing counts and maintaining a correct net count of the machine slide movement. It has been found that conventional bidirectional counters which require a separate count direction control command signal will not reverse in counting order fast enough due to the time required to generate a separate direction control command. The counter of the present system being enabled by the existing states of the counter stages requires only the time necessary to register the incoming count pulse on either the forward or reverse input. The time required to register a pulse in the present counter is made less than the duration of the square wave output of the phase detector 9 which is approximately 15 microseconds. Therefore, the counter responds to each count pulse applied thereto whether it be from the forward or reverse output of the detector 9. The counter is provided with a count display device 11 which is connected to the various stages of each of the decades to display the instantaneous net count registered in the counter. The count display may be any suitable visual indicator or display device. One suitable display device is the Burroughs Corporation Model No. 7R41 Cold Cathode Count Display. This display has gating circuitry provided which is connected to the various stages as will be shown in the description with reference to FIGS. 2 and 3.

Referring now to FIG. 2, there is shown a schematic of the $10°$ decade of the counter of FIG. 1. Since each of the decades are substantially identical, detailed description of the connections of the first, or $10°$, decade is deemed sufficient for a complete understanding of the overall operation of the counting system.

The pulses to be counted by the counter must be of sufficient duration to trigger the counter and must vary between "1" and "0" logic signal levels. In the embodiment of the invention herein described, a logical "1" represents a negative potential of about $-12$ volts, and a logical "0" represents a potential of 0 volts. Obviously, other logical levels may be employed in practicing the invention.

The typical decade comprises a chain of four binary stages including flip-flops 13, 15, 17, and 19, designated in terms of their binary number functions as $2^0$, $2^1$, $2^2$, and $2^3$. Each of the flip-flops has a set and reset input and corresponding outputs designated S and R, respectively. Each flip-flop changes states from the reset state (R output at the "1" level and S output "0" level) to the set state upon the application of a logic "1" level to the S input, thus changing the S output to a "1" level and the reset output to a "0" level. The flip-flop is switched back to the reset state by the application of the "1" level to the R input. The $2^0$ binary stage includes flip-flop 13 and OR gates 21 and 23 connected to the S and R inputs of flip-flop 13, respectively. Each of the OR gates 21, 23 has two inputs, one of which is connected to a forward input terminal F and the other to a reverse input terminal R. The set output S of flip-flop 13 is connected to one input of an AND gate 25. A second input of gate 25 is connected to the forward input terminal F. The output of gate 25 is connected to one of two inputs of an AND gate 27 which gates carry pulses to the next, or the $10^1$ decade in this case, on every 10th net forward count.

The $2^1$ binary stage is provided with a gating arrangement connected to the S and R inputs of flip-flop 15 to gate both forward and reverse pulses to flip-flop 15. OR gates 29 and 31 are connected to the set S and reset R inputs, respectively, of flip-flop 15. Gate 29 has two input leads, one of which is connected to the output of an AND gate 33 and the other is connected to the output of an AND gate 35. OR gate 31 has two input leads, one of which is connected directly to the output of AND gate 25 and the other is connected to the output of an AND gate 37. AND gate 33 has two inputs, one of which is connected to receive forward counts gated thereto through AND gate 25. Gate 35 has three input leads, one of which is connected to the R output of flip-flop 13, and the other is connected to a reverse pulse input line 39. The last gate 37 of the second stage has two input leads, one of which is connected to the R output of flip-flop 13 and the other to line 39.

The $2^2$ binary stage is provided with a gating arrangement connected to the S and R inputs of flip-flop 17 to gate both forward and reverse pulses thereto. OR gates 41 and 43 are connected to the set S and reset R inputs, respectively, of flip-flop 17. Gate 41 has two input leads, one of which is connected to the output of an AND gate 45 and the other to the output of an AND gate 47. OR gate 43 has two inputs, one of which is connected to the output of an AND gate 49 and the other is connected to the output of an AND gate 51. AND gate 45 has two input leads, one of which is connected to the output of AND gate 25 and the other is connected to the S output of flip-flop 15. AND gate 47 has three inputs, one connected to the R output of flip-flop 13 and another connected to the reverse count line 39. AND gate 49 has two inputs, one of which is connected to the output of AND gate 25 and the other to the S output of flip-flop 15. AND gate 51 has three input leads, one connected to the R output of flip-flop 15, another to the R output of flip-flop 13 and the last connected to the reverse count line 39.

The $2^3$ binary stage, including flip-flop 19, has a similar gating arrangement to that of $2^1$ stage. OR gates 53 and 55 are connected to the S and R inputs, respectively, of flip-flop 19. Gate 53 has two inputs, one of which is connected to the output of an AND gate 57 and the other to the output of an AND gate 59. OR gate 55 has two input leads, one of which is connected to the output of gate 25 and the other is connected to the output of an AND gate 61. Gate 57 has three input leads, one connected to the output of gate 25, another connected to the S output of flip-flop 15, and the last connected to the S output of flip-flop 17. Gate 59 also has three inputs, one connected to the R output of flip-flop 13 and another connected to the reverse count line 39. The last gate 61 has two input leads, one connected to the R output of flip-flop 13 and the other to the reverse count line 39.

To complete the connections of the $2^3$ stage, the output S of flip-flop 19 is connected to a separate input of a "forward" pulse carry AND gate 27 and the remaining input of gate 47. The R output of flip-flop 19 is connected to the remaining input of gate 33 and to one input of an AND gate 63. Gate 63 has two other inputs, one of which is connected to the R output of flip-flop 17, and the other is connected to the R output of flip-flop 15. The output of gate 63 is connected through an inverter 65 to the remaining input of gate 35. Further, the output of gate 63 is connected to one of three inputs of a "reverse" pulse carry AND gate 67. The remaining two inputs are connected to the reverse count line 39 and the R output of flip-flop 13, respectively. The output of gate 67 is connected to the reverse input R of the next decade.

The count display 11 is provided with AND gates 69, as shown in FIG. 3. The visual indicator may be a cold cathode indicator tube which contains 10 cathode numbers, including numerals "0" to "9", inclusive. The numbers are cold cathode electrodes, and glow is produced when a suitable potential is connected between a cathode and the tube anode. As shown in FIG. 3, the output of the gate representing "0" count is connected to the "0" cathode, the output of the gate representing a count of "1" is connected to the cathode numeral "1", etc. To illustrate the necessary connections to the four inputs of each gate 69, take, for example, the "0" count gate which is connected to the reset R outputs of each binary stage indicated as D2, D4, D6, and D8 (FIG. 2). Similarly, the remaining gates are connected to various outputs D1 through D8 to light the appropriate numerical cathode corresponding to the registered count. The above portion of the display represents the first or $10°$ decade and additional decades are provided with similar gates and numerical cathodes so that the complete registered count can be instantaneously displayed.

The operation of the counter may be best understood by referring to the logic table of FIG. 4. The table shows the condition, set S or reset R of each binary stage for the particular count as indicated in the left-hand column. It will be noted that in the table the $2^0$ binary flip-flop 13 must change states with each pulse received. This is accomplished by applying the input counts from the forward and reverse outputs of the phase detector 9 directly to both OR gates 21 and 23. Assume that no counts have been received, i.e., all the flip-flops are in the reset condition, and that a series of forward pulses are applied to the input terminal F. The arrival of a forward pulse to OR gate 21 presents a logic level "1" to the S input of flip-flop 13 causing it to be set raising the previously "0" output S to a "1". The arrival of this same pulse at gate 23 has no effect, since at the same time of arrival the flip-flop 13 is in the reset state. It will be noted that the flip-flop 13 goes set each time an uneven count (1, 3, etc.) is received. Upon receiving a second forward count flip-flop 13 is reset by the application of the pulse to gate 23 and gate 25 is enabled, changing the output to a "1" level. This "1" is applied to gate 33 of the $2^1$ binary stage which is enabled due to the "1" applied to its other input from the R output of flip-flop 19. Thus, the output of gate 29 is at the "1" level setting flip-flop 15. It should be noted that the "1" from gate 25 is also applied to OR gate 31 but has no effect since the flip-flop 15 is in the reset state. The next, or third, forward pulse applies to a "1" to the S input of flip-flop 13 causing it to be reset. Gate 25 is not enabled since the output of flip-flop 13 is initially at "0" level. The fourth forward pulse resets flip-flops 13 and 15 and simultaneously applies a "1" to AND gate 45 which is enabled by the S output of flip-flop 15 being initially at the "1" level. A "1" level is applied to OR gate 41, setting flip-flop 17. The fifth forward input pulse then sets flip-flop 13 only. The sixth input pulse resets flip-flop 13 and sets flip-flop 15 in the same manner as discussed for the registration of the second forward input pulse. Then the seventh forward input pulse sets flip-flop 13 only. The eighth pulse resets flip-flops 13, 15, and 17, as previously described, and sets flip-flop 19. The output of gate 25 attains a "1" level; and, since gate 49 is enabled by the S output of flip-flop 15 being initially at a "1" level, the output of gate 49 is at the "1" level enabling gate 43 to reset flip-flop 17. AND gate 57 of the $2^3$ binary stage is enabled since the outputs of both flip-flops 15 and 17 are initially set. Thus, OR gate 53 applies a "1" to the S input of flip-flop 19, causing it to be set. Note the setting of flip-flop 19 places a "1" at the enabling input of the carry AND gate 27 so that the 10th forward count will be transmitted to the next decade. The application of the ninth consecutive forward pulse sets flip-flop 13 only. Thus, the counter has counted up to the highest count for the first decade. A tenth forward pulse is passed to the forward input F of the next decade through gate 27 and at the same time resets all the flip-flops of the $10^0$ decade in the same manner as previously described.

To demonstrate the reversibility of the counter, assume that nine consecutive forward pulses have been applied to the F input of the counter and a "9" is displayed in the count display. As shown in the table of FIG. 4, binary stages $2^0$ and $2^3$ are set and $2^1$ and $2^2$ are reset. A reverse count pulse applied at terminal R of the input of the counter enables OR gate 23 to set flip-flop 13 by the application of a "1" to the R input of flip-flop 13. All the other AND gates to which the reverse count line 39 is connected are disabled and flip-flop 13 is the only binary to change states. Therefore, the net count has been reduced by one as represented by flip-flop 19 remaining set. When another reverse pulse is received to reduce the count to seven, flip-flop 13 is set through OR gate 21 and, as indicated by the chart of FIG. 4, flip-flops 15 and 17 are set while flip-flop 19 is reset. AND gate 35 of the $2^1$ binary stage is enabled to set flip-flop 15 since the application of the reverse pulse from the reverse count line 39 applies a "1" level to the only remaining input which is initially at the "0" level. The other two inputs to gate 35 are initially at the "1" level since the R output of flip-flop 13 is at the "1" level and the output of inverter 65 is at the "1" level. Flip-flop 17 is similarly set by the application of the "1" from line 39 to gate 47 whose other inputs are initially at the "1" level. AND gate 61 is enabled by the application of the "1" from the reverse count line 39 and the R output "1" of flip-flop 13. Thus, the "1" output of gate 61 is applied to the R input of flip-flop 19 through OR gate 55. The application of additional reverse pulses will reduce the net count correspondingly as described above for the forward count procedure.

It will be noted that flip-flop 15 (binary $2^1$) must change states on the reception of every uneven count except the count corresponding 0 nine. This is effected by disabling AND gate 35 upon the application of a "0" from the inverter 65. Inverter 65 inverts the logic level of the output of AND gate 63, that is converting a "1" to a "0" level and vice versa. Gate 63 is enabled each time flip-flops 15, 17, and 19 are all in the reset state (R outputs at the "1" level). These flip-flops are in the reset state at the same time on an even count only when the count is 0; consequently, gate 35 of the $2^1$ binary stage is disabled for the reverse count representing nine. Further, the "1" output at gate 63 is applied to AND gate 59 of the $2^3$ binary stage so that when counting down from 10 gate 59 is enabled to set flip-flop 19. The "1" output of gate 63 also is one enabling input to AND gate 67 which transmits reverse counts on line 39 to the next decade when the $10^0$ decade is reduced to 0 making all the inputs to gate 67 at the "1" level.

The counting direction can be reversed at any point in the counting procedure and it will be understood that there is no delay involved in reversing the counter since there are no direction command controls necessary. To illustrate the speed at which the counter will reverse, assume that a count of six is registered, that is, according to FIG. 4, flip-flops 15 and 17 are set and flip-flops 13 and 19 are reset. As soon as the sixth count is registered from the receipt of a forward pulse, gate 37 is enabled by the receipt of a reverse pulse "1" on line 39 together with the "1" from the output of flip-flop 13 resetting flip-flop 15. Simultaneously, flip-flop 13 is set since, as pointed out above, it changes states with each forward or reverse pulse received. Since gate 59 is disabled by the "0" at the output of the gate 63, flip-flop 19 remains reset and the registered count is reduced by one to the count of five which is displayed in the $10^0$ column of display 11 (FIG. 1).

Thus, it will be seen that the existing state of the various binary steps automatically enables the counter to register either a forward or reverse count at any given net count and no delay is necessary between the application of pulses to enable the counter to count in the forward or reverse direction, increasing or decreasing, respectively, the net count.

Figure 5:
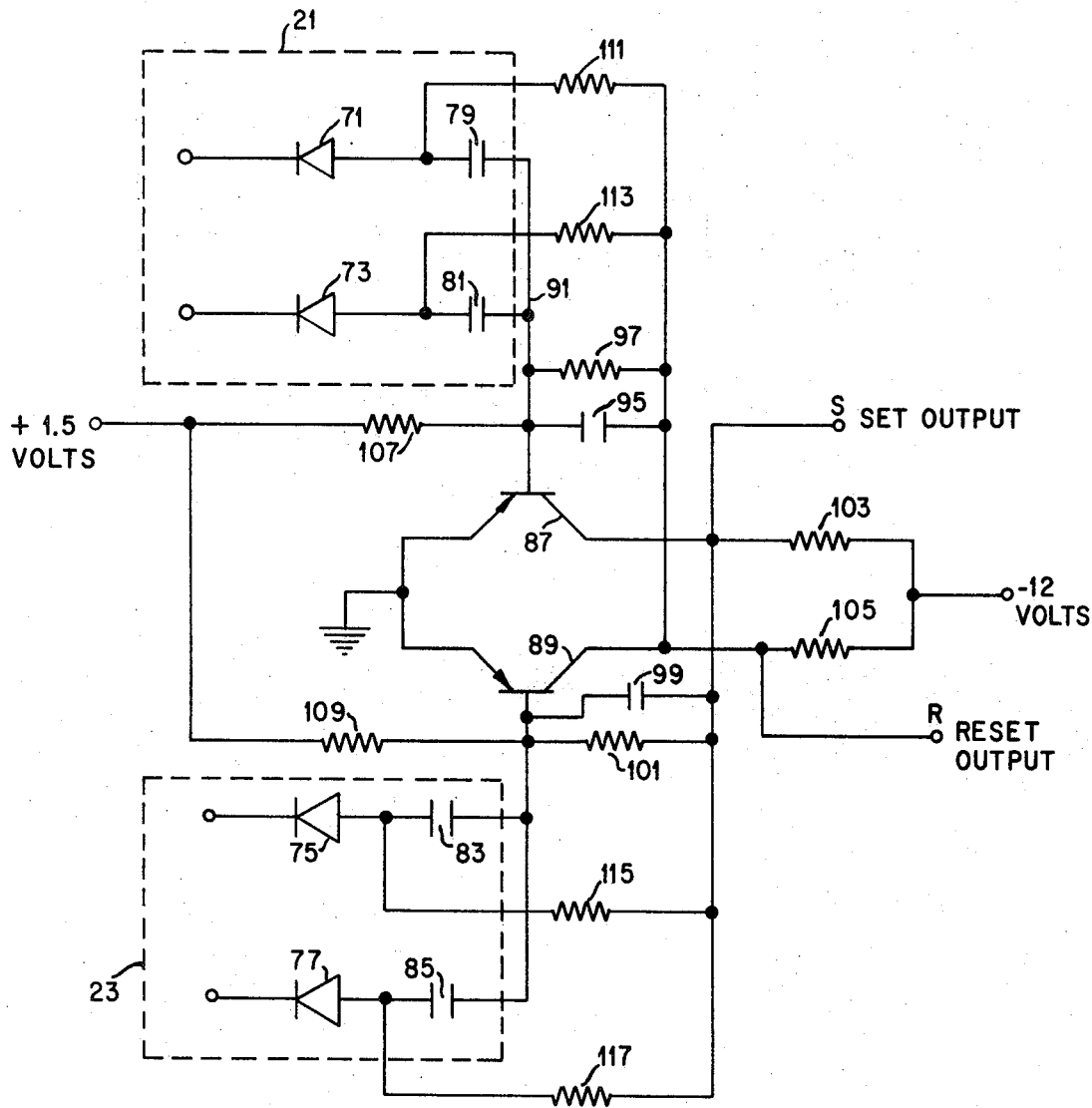
FIG. 5 is a circuit diagram of a flip-flop including input OR gates which may be employed in the logic diagram of FIG. 2.

Referring now to FIG. 5, there is shown a circuit diagram of an OR gated flip-flop which is particularly advantageous for use in the present counter. More specifically, this gated flip-flop combines the functions of the flip-flop and its associated input OR gate. These units are commercially available in integrated circuit form which considerably reduces the cost and space requirements when constructing the counter. The OR gates are shown within dotted lines, and assuming this to be the $2^0$ binary stage for the purpose of illustration, this would be OR gates 21 and 23, respectively. The OR gates consist of diodes 71, 73, 75, and 77 having their anodes connected in series with capacitors 79, 81, and 85, respectively. A pair of PNP transistors 87 and 89 are connected in a standard flip-flop arrangement with the emitter of each transistor connected to ground. The flip-flop shown employs base triggering; therefore the output of OR gate 21 at lead 91 is connected to the base lead of transistor 87 and the output of OR gate 23 at lead 93 is connected to the base lead of transistor 89. To complete the flip-flop the base of transistor 87 is connected to the collector of transistor 89 through a parallel RC network consisting of capacitor 95 and resistor 97 through a similar RC network consisting of capacitor 99 and resistor 101. The collectors of transistors 87 and 89 are connected to a negative 12 volt supply through resistors 103 and 105, respectively. A base bias of 1.5 volts positive is connected to the base of transistor 87 through a resistor 107 and to the base of transistor 89 through a resistor 109. The set S output of the flip-flop is taken at the collector of transistor 87 and the reset R output is taken at the collector of transistor 89. The anodes of diodes 71 and 73 are connected to the collector of transistor 89 through resistors 111 and 113, respectively. The anodes of diodes 75 and 77 are connected to the collector of transistor 87 through resistors 115 and 117, respectively. These resistors provide the bias required for either of the inputs to switch the flip-flop. This arrangement allows the flip-flop to be set by the application of a logic "1" to either input terminal of the OR gate 21 which reverse biases transistor 87 turning it off. When the flip-flop is in the "set" state transistor 89 is conducting while transistor 87 is nonconducting, providing a "1" or −12 volt at the S output. Similarly, a "1" applied to either of the inputs of OR gate 23 causes the flip-flop to be reset.

In view of the above and numerous other equally possible arrangements, the scope of the present invention should be considered limited only by the following claims attached to and forming a part of this specification.

I claim:

1. In a bidirectional counting system for a position indicating device wherein the displacement of a movable component is monitored by an interferometer, the combination comprising:

a. an interferometer feedback generator for sensing movement of said component and generating first and second phase-displaced signals for each increment of movement of said component sensed by said feedback generator, said first signal leading said second signal when a forward movement is sensed and said second signal leading said first signal when a reverse movement is sensed;

b. a phase detector connected to receive said first and second signals from said feedback generator and producing a "forward" count pulse at a forward output when said first signal is leading and producing a "reverse" count pulse at a reverse output when said second signal is leading;

c. a bidirectional counter including a first input terminal for receiving "forward" count pulses connected to said forward count output of said phase detector;

d. a second input terminal for receiving "reverse" count pulses connected to said reverse count output of said phase detector;

e. a plurality of binary stages divided into $10^N$ binary counting decades, each of said decades including four binary stages, each of said binary stages having a flip-flop operable in either a "set" or "reset" state, said flip-flop having a set and reset input and corresponding outputs, and first and second OR gates connected respectively to said set and reset inputs of said flip-flop, each of said OR gates having a first input connected to receive pulses representing an increase in the count and a second input connected to receive pulses representing a decrease in the count, said first input terminal of said counter connected to said first inputs of said OR gates of a first binary stage, and said second input terminal of said counter connected to said second inputs of said OR gates of said first binary stage;

f. a plurality of forward count AND gates each having an output connected to respective first inputs of said first and second OR gates of each of said stages, excluding said first stage, each of said forward AND gates having a first input for receiving forward count pulses and further inputs connected to said set outputs, respectively, of each preceding stage so that the existing state of said flip-flop of each of said stages enables the counter to receive and register according to a predetermined binary counting order said forward count pulses applied to said first input terminal of said counter;

g. a plurality of reverse count AND gates, each having an output connected to respective second inputs of said first and second OR gates of each of said stages, excluding said first stage, each of said reverse count AND gates having a first input connected to said second input terminal of said counter and further inputs connected to said "reset" outputs of the flip-flops of each preceding stage so that the existing state of said flip-flops of each of said stages enables the counter to receive and register according to said predetermined binary counting order said "reverse" pulses applied to said second input terminal of said counter;

h. a forward pulse carry AND gate having an output connected to the forward count input of a next succeeding decade, said forward pulse carry AND gate having a first input connected to receive even numbered forward count pulses and a second input connected to said set output of the fourth binary stage of said decade, said AND gate connected to said second input of said first OR gate of said third stage of said decade having a further input connected to said set output of said fourth stage, said AND gate connected to said first input of said first OR gate of said second stage of said decade having a further input connected to said reset output of said fourth stage of said decade;

i. a further AND gate having first, second and third inputs connected to said reset outputs of said flip-flops of said second, third and fourth stages, respectively;

j. an inverter connected between the output of said further AND gate and a third input of said reverse count AND gate connected to said second input of said first OR gate of said second stage; and k. a reverse pulse carry AND gate having an output connected to the reverse input of said next succeeding decade, said reverse carry AND gate having a first input connected to said second input terminal of said counter, a second input connected to said reset output of said first stage, and a third input connected to the output of said further AND gate.